(12) United States Patent
Calhoun et al.

(10) Patent No.: US 11,169,805 B2
(45) Date of Patent: Nov. 9, 2021

(54) DYNAMIC PROCESSOR CACHE TO AVOID SPECULATIVE VULNERABILITY

(71) Applicant: HEWLETT PACKARD ENTERPRISE DEVELOPMENT LP, Houston, TX (US)

(72) Inventors: Michael Bozich Calhoun, Roseville, CA (US); Divakar Chitturi, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 219 days.

(21) Appl. No.: 15/967,558

(22) Filed: Apr. 30, 2018

(65) Prior Publication Data

US 2019/0332379 A1   Oct. 31, 2019

(51) Int. Cl.
*G06F 9/30* (2018.01)
*G06F 9/38* (2018.01)

(52) U.S. Cl.
CPC ........ *G06F 9/30047* (2013.01); *G06F 9/3802* (2013.01); *G06F 9/3842* (2013.01)

(58) Field of Classification Search
CPC .. G06F 9/3802; G06F 9/3842; G06F 9/30047; G06F 12/00; G06F 13/00
See application file for complete search history.

(56) References Cited

U.S. PATENT DOCUMENTS

| | | | |
|---|---|---|---|
| 5,996,060 A * | 11/1999 | Mendelson | ............. G06F 9/383 712/205 |
| 7,124,254 B2 | 10/2006 | Fahs | |
| 8,185,700 B2 | 5/2012 | Gimeno | |
| 8,255,626 B2 | 8/2012 | Blundell | |
| 9,612,961 B2 * | 4/2017 | Solihin | ............... G06F 12/0848 |
| 9,645,929 B2 | 5/2017 | Van Zoeren | |

(Continued)

FOREIGN PATENT DOCUMENTS

GB    2570110 A  *  7/2019  ........... G06F 9/3842

OTHER PUBLICATIONS

Jim Handy, The Cache Memory Book, 1998, Academic Press, Inc., Second Edition, pp. 63-64 (Year: 1998).*

(Continued)

*Primary Examiner* — Tuan V Thai
(74) *Attorney, Agent, or Firm* — Park, Vaughan, Fleming & Dowler LLP (57) ABSTRACT

A processor including a logic unit configured to execute multiple instructions being one of a speculative instruction or an architectural instruction is provided. The processor also includes a split cache comprising multiple lines, each line including a data accessed by an instruction and copied into the split cache from a memory address, wherein a line is identified as a speculative line for the speculative instruction, and as an architectural line for the architectural instruction. The processor includes a cache manager configured to select a number of speculative lines allocated in the split cache. The cache manager prevents an architectural line from being replaced by a speculative line based on a number of speculative lines allotted in the split cache, and manages the number of speculative lines to be allocated in the split cache based on the number of speculative lines relative to a number of architectural lines.

20 Claims, 8 Drawing Sheets

(56) References Cited

U.S. PATENT DOCUMENTS

| | | | |
|---|---|---|---|
| 2004/0154012 A1 | 8/2004 | Wang et al. | |
| 2011/0047334 A1* | 2/2011 | Eichenberger | G06F 11/1405 711/141 |
| 2011/0145505 A1* | 6/2011 | Anand | G06F 12/0895 711/130 |
| 2012/0166765 A1* | 6/2012 | Gonion | G06F 8/4441 712/200 |
| 2017/0177365 A1* | 6/2017 | Doshi | G06F 9/30043 |
| 2019/0114422 A1 | 4/2019 | Johnson et al. | |
| 2019/0272239 A1* | 9/2019 | Hagersten | G06F 12/0891 |
| 2019/0310941 A1* | 10/2019 | Veshchikov | G06F 9/38 |

OTHER PUBLICATIONS

Kocher et al., "Spectre Attacks: Exploiting Speculative Execution", Jan. 3, 2018, pp. 1-16.

Lipp et al., "Meltdown", Unpublished, Jan. 3, 2018, pp. 1-16.

"Why Raspberry Pi Isn't Vulnerable to Spectre or Meltdown," Y Hacker News, Retrieved from Internet Mar. 7, 2018, 18 pages, <https://news.ycombinator.com/item?id=16080002>.

\* cited by examiner

DYNAMIC PROCESSOR CACHE TO AVOID SPECULATIVE VULNERABILITY

TECHNICAL FIELD

Embodiments described herein are generally related to the field of processor architectures for cache management. More specifically, embodiments described herein are related to hardware solutions to prevent vulnerabilities in the cache management of a processing unit used in a computing device.

BACKGROUND

To take advantage of high processing capabilities of densely packed logic units in a logic unit such as a central processing unit (CPU), a graphic processing unit (GPU) or any other processing unit used in a computing device, current processor architectures are designed to perform out-of-order execution of multiple computational threads or branches. However, it has been recently demonstrated that cache management in current processor architectures may lead to serious vulnerabilities and data breaches from malicious third party applications running in parallel in the processor. The vulnerabilities arise from cache miss events wherein a cache management unit fails to retrieve data for executing a line in the instruction queue, forcing the processor to retrieve the missing data directly from memory, and leaving a detectable mark on the cache. Current solutions to such vulnerability for data exposure include cache randomization techniques handled by software operating directly over the processor control. These software solutions, while potentially more secure, include a high cost in processing performance, as each instruction in the processor is encoded and decoded appropriately during execution.

The description provided in the background section should not be assumed to be prior art merely because it is mentioned in or associated with the background section. The background section may include information that describes one or more aspects of the subject technology.

SUMMARY

In certain aspects, a processor as disclosed herein includes a logic unit configured to execute multiple instructions, each of the multiple instructions being one of a speculative instruction or an architectural instruction. The processor also includes a split cache comprising multiple lines, each line including a data accessed by an instruction and copied into the split cache from a memory address, wherein a line is identified as a speculative line for the speculative instruction, and as an architectural line for the architectural instruction. The processor includes a cache manager configured to select a number of speculative lines to be allocated in the split cache, based on a current state of the processor. The cache manager is also configured to prevent an architectural line from being replaced by a speculative line, and to manage the number of speculative lines to be allocated in the split cache when the speculative instruction requests a data access based on the number of speculative lines relative to a number of architectural lines.

In certain aspects, a cache as disclosed herein includes a management unit and a first plurality of architectural lines storing data fetched by an architectural instruction to be executed by a processor coupled with the cache. The architectural instruction, when executed, is configured to modify an architecture of the cache. The cache also includes a second plurality of speculative lines storing data fetched by a speculative instruction, wherein the speculative instruction is invalidated by the management unit. A number of the first plurality of architectural lines and the second plurality of speculative lines is dynamically determined based on a state of the processor.

In certain aspects, a method includes retrieving, with a fetch engine, a data associated with an instruction to be executed by a logic unit of a processor, from an external memory. The instruction is one of a speculative instruction or an architectural instruction. The method also includes copying the data from a memory address to a speculative line in a split cache, when the data is fetched by a speculative instruction, and to an architectural line in the split cache when the data is fetched by an architectural instruction. The method also includes selecting a number of speculative lines to be allocated in the split cache based on a current state of the processor, preventing an architectural line in the split cache from being replaced by a speculative line, and managing the number of speculative lines to be allocated in the split cache when a speculative instruction requests a data access based on the number of speculative lines relative to a number of architectural lines in the split cache.

In certain aspects, a system is described including a means for storing instructions. The system further includes a means to execute the instructions to perform a method, the method including retrieving, with a fetch engine, a data associated with an instruction to be executed by a logic unit of a processor, from an external memory. The instruction is one of a speculative instruction or an architectural instruction. The method also includes copying the data from a memory address to a data in a speculative line in a split cache, when the data is fetched by a speculative instruction, and to an architectural line in the split cache when the data is fetched by an architectural instruction. The method also includes selecting a number of speculative lines to be allocated in the split cache based on a current state of the processor, preventing an architectural line in the split cache from being replaced by a speculative line, and managing the number of speculative lines to be allocated in the split cache when a speculative instruction requests a data access based on the number of speculative lines relative to a number of architectural lines in the split cache.

BRIEF DESCRIPTION OF THE DRAWINGS

In the figures, elements and steps denoted by the same or similar reference numerals are associated with the same or similar elements and steps, unless indicated otherwise.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides a solution for high performance processing with substantial reduction of vulnerability to cache attacks from malicious third party applications by including a split cache coordinated with out-of-order execution instructions in the execution pipeline of a CPU, a GPU, or any other processing unit used in a computing device. More specifically, embodiments as disclosed herein may be used for preventing processor vulnerabilities (e.g., "Meltdown" and "Spectre," among other attacks based on cache miss events). The Meltdown and Spectre processor vulnerabilities exploit cache states that are modified by speculative execution to breach processor security. Typically, speculative instructions may be discarded before they affect processor state, but after a speculative data access triggers a change of the contents of the processor caches. Accordingly, exploitive code like Meltdown or Spectre cause speculative use of protected data to modify which lines are in the cache. Protected data may then be extracted by examining which cache lines are resident.

Other types of cache vulnerability may leak secret data in a manner similar to a Meltdown attack, even when the cache is protected against storing speculative data. Accordingly, some malicious software may take advantage of the design of the cache 'least recently used' (LRU) algorithm, to track the number of cached pages in a cache path. When the cache path is filled with tracked pages, attempts to load an additional cache line into that location result in an eviction of a cache line from a tracked page and the count of cached pages decreases. By carefully aligning the page locations and filling a range of cache ways with tracked pages, an attacker may recover secret data by causing the inaccessible desired secret value to access to evict a page similarly to a basic Meltdown attack. This attack may succeed even when speculative access is removed from the cache because the speculative and tracked cache lines contend for the same limited cache path. Limiting the scope of probe instructions also does not protect from these attacks, as the attack does not rely on probing of the speculative cache lines.

Software workarounds to the above problems have been proposed, but they come at a cost of processor performance. Processor microcode (for processors that use microcode) may be modified to at least lower the exposure to speculative execution hazards, but at a cost of processor performance. A processor may link execution of the component micro-ops that make up complex instructions to avoid executing security functions ahead of data access. This would avoid the Meltdown vulnerability, but not the Spectre vulnerability. A processor may block speculative execution of data accesses that miss in the cache until they are known to not be speculative. This gives up some, but not all, of the performance benefit of speculative execution. Some approaches may avoid the current form of cache vulnerabilities, but requires more bandwidth to the cache to update the cache lines to architectural, and may expose a new hazard that keys on cache lines that were in the cache, but are displaced when a cache line is moved in and marked speculative, even if it is eventually invalidated because it is speculative.

Embodiments as disclosed herein provide a mechanism to prevent speculative instructions from modifying a cache state, while still allowing the performance benefit of speculative instruction execution (e.g., out-of-order and speculative branch execution).

Some embodiments include a cache manager to ensure that an architectural cache lines resident before the speculative instruction is executed remains in the cache after the speculative execution is invalidated. Additionally, a cache line that is not in the cache before the speculative instruction is executed is removed from the cache if it was fetched by a speculative instruction that is later invalidated. The result is a cache that is inert to speculative execution: nothing added, nothing removed, as a result of speculative execution.

Embodiments as disclosed herein include cache lines that hold a status bit to indicate that the instruction that fetched the cache line was speculative or architectural. The status bit enables tracking instructions in the architectural/speculative flow. In some embodiments, when a processor execution logic determines that it is desirable to invalidate an speculative instruction, the cache lines fetched by these instructions are marked with the status bit in a speculative state.

The disclosed system addresses a technical problem tied to computer technology and arising in the realm of computer operation, namely the technical problem of cache attack vulnerabilities from speculative execution pathways. Further, embodiments as disclosed herein provide a substantial reduction of cache attack vulnerabilities at substantially reduced cost in processor performance, with reduced impact in hardware re-design of the computer CPU, and real estate usage. In some embodiments, speculative instructions may be allowed to modify cache state, as long as they are not later invalidated.

The cache architecture disclosed herein is inert to speculative instructions that are later invalidated. More specifically, in embodiments as disclosed herein, data that is not in the cache before speculative execution is not fetched into the cache by invalid speculative instructions. Furthermore, data that is currently in the cache and is related to valid execution is maintained there, even via contention for capacity, when an invalid speculative instruction requests cache space for execution. Thus, embodiments as disclosed herein offer an advantage from existing cache architectures that only rewind the more visible changes to processor state after the speculative instruction is eliminated.

Embodiments as disclosed herein prevent speculative instructions from modifying cache state, e.g., by at least partially preventing the triggering of cache line evictions. For example, some embodiments prevent the eviction of cache lines that may leak or expose sensitive data. In some embodiments, cache lines fetched by speculative instructions are not allowed to evict architectural cache lines. Further, embodiments as disclosed herein maintain the performance benefit of speculative instruction execution without security exposure. Additionally, new variants of the Meltdown and Spectre vulnerabilities are anticipated and addressed in embodiments as disclosed herein.

Many attacks based on cache vulnerabilities of common CPU architectures (e.g., Spectre and Meltdown) rely on cache tools that probe the state of the cache to recover secret information leaked by the speculative execution. To further prevent this information from leaking, for example during a probe command that runs before the management unit can evict the offending speculation, embodiments as disclosed herein prevent the cache probe tools and instructions from acting on cache lines with status bits set to a speculative state. In some embodiments, queries to cache lines marked with a speculative state will return the same information as if those cache lines were invalid. In some embodiments, architectural instructions that enforce serialization, atomicity, and boundaries, like 'fence,' 'sfence,' 'lfence,' 'wall,' and the like, are used to prevent speculative execution/fetch/probe of speculative cache lines. Embodiments as disclosed herein reduce the performance impact of invalidating speculative cache lines, compared to non-targeted approaches that invalidate the entire cache or enforce memory barriers, or rewriting the operating system kernel to prevent the shared memory from leaking secret or encrypted information. Speculative cache lines that are invalidated avoid "writeback to memory" steps. In some aspects, invalidating or evicting speculative cache lines also improves cache architecture as it removes cache pollution.

Further, some embodiments offer the advantage of setting speculative lines in the cache to architectural (e.g., associated with valid execution) when the speculative line is accessed by an architectural (e.g., valid) instruction. Thus, after a period of time, most or all speculative cache lines issued after a given boundary may be cleared from the cache (evicted, retired, or validated).

Figure 1:
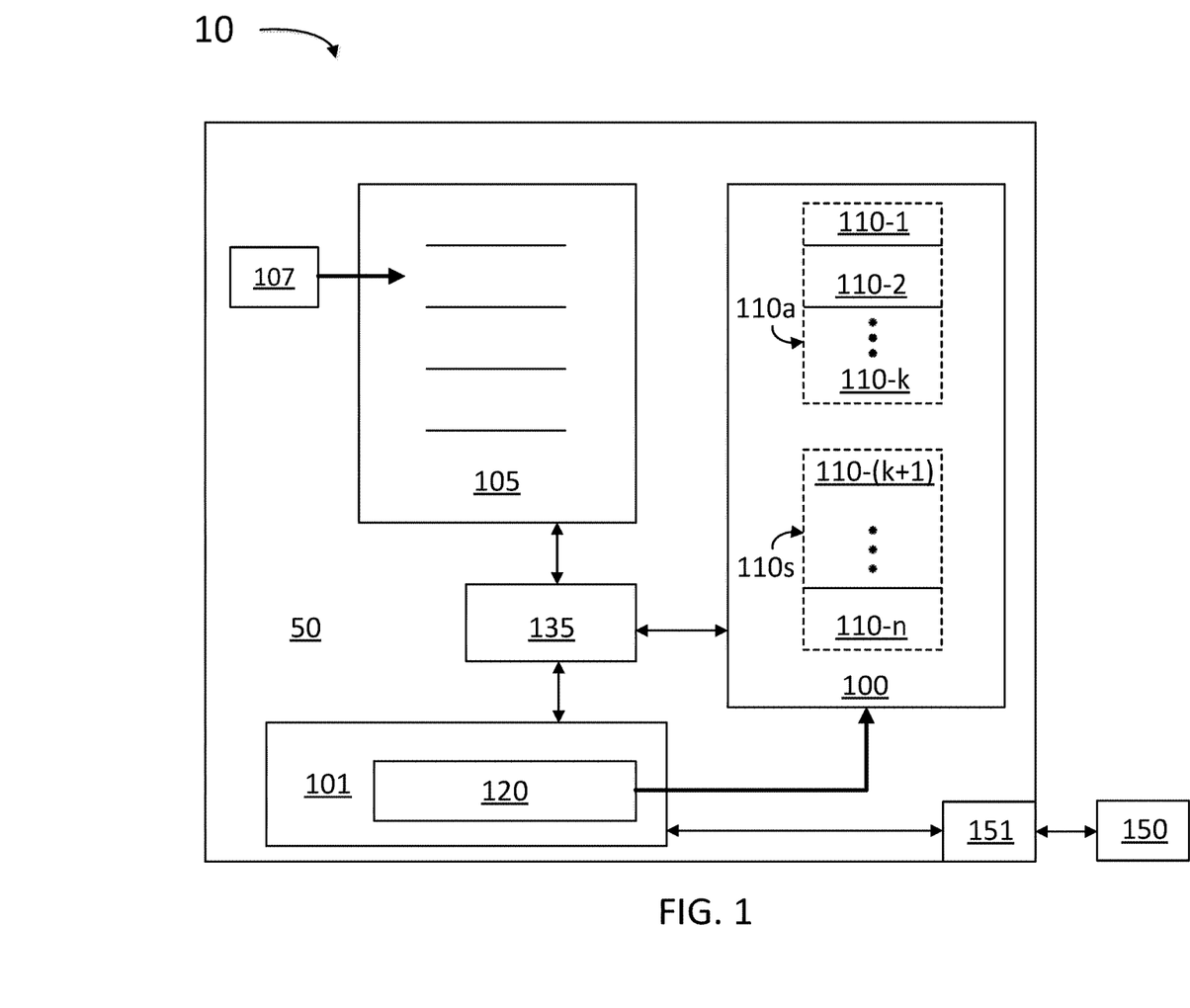
FIG. 1 illustrates a computing device including a logic unit and a memory, according to some embodiments.

FIG. 1 illustrates a computer device 10 including a logic unit 50 and a memory 150, according to some embodiments. Logic unit 50 is configured to execute multiple instructions (e.g., a CPU, a GPU and the like) listed in a schedule buffer 105. Each of the instructions in schedule buffer 105 may be classified as a speculative instruction or an architectural instruction. In some embodiments, a speculative instruction begins execution before a committed program order for logic unit 50 is known. In some embodiments, logic unit 50 further includes an out-of-order logic which, together with split cache 100 and schedule buffer 105, defines a microarchitecture state configured to be modified architecturally to improve processor performance. In some embodiments, schedule buffer 105 is configured to invalidate a speculative instruction that has not been executed prior to a current instruction that is being executed. An architectural instruction is an instruction that is included in the true instruction flow. Schedule buffer 105 may include a branch predictor unit (BPU) 107 that determines the next instruction in line for execution in schedule buffer 105. BPU 107 includes a logic circuit to detect an invalid branch of instructions when a first instruction in a separate branch is committed for execution.

For example, a given instruction listed further down in schedule buffer 105 may generally start out as a speculative instruction. Execution of speculative instructions may be desirable to improve the processor performance, especially during parallel computation, when there are pieces of a complex sequence of operations that may be performed out of sequence. Some speculative instructions in schedule buffer 105 may be discarded when preceding instructions are executed. In some embodiments, a speculative instruction becomes architectural at the point of retirement (or scheduling for retirement). In some embodiments, an instruction may start out as architectural in schedule buffer 105 when it belongs to a branch or thread that will certainly be executed by logic unit 50, regardless of how far along the pipeline is in schedule buffer 105.

Logic unit 50 also includes a split cache 100 having multiple cache lines 110-1, 110-2 through 110-n (hereinafter, collectively referred to as "cache lines 110"). Each cache line 110 holds data associated with one of the instructions in schedule buffer 105. Each cache line 110 includes a data accessed by an instruction and copied into split cache 100 from a memory address. A cache line 110 is identified as a speculative line 110s for the speculative instruction, and as an architectural line 110a for the architectural instruction.

Logic unit 50 also includes a fetch engine 101 to retrieve data associated with the instructions from an external memory 150. Fetch engine 101 includes a probe 120 configured to access split cache 100 and determine the status of cache lines 110 (e.g., whether they are architectural lines 110a or speculative lines 110s).

Logic unit 50 also includes a cache manager 135 configured to select a number of architectural lines 110a (e.g., k), and a number of speculative lines 110s (e.g., n-k) to be allocated in split cache 100, based on a current state of logic unit 50. This may prevent an architectural line 110a from being replaced by a speculative line 110s. In some embodiments, cache manager 135 is configured to manage the number of speculative lines 110s to be allocated in split cache 100 when a speculative instruction requests a data access based on the number of speculative lines 110s (e.g., n-k) relative to a number of architectural lines 110a (e.g., 'k').

In some embodiments, cache manager 135 is configured to modify the number, n-k, of speculative lines 110s in split cache 100 based on one of a least recently used state, a modified state, an exclusive state, a shared state, or an invalid state, of one or more architectural lines 110a in split cache 100. In some embodiments, cache manager 135 is configured to increase the number of speculative lines 110s when an architectural line 110a in the split cache is free or invalid. In some embodiments, cache manager 135 is configured to wait for a pre-selected number of accesses to speculative lines 110s before adjusting the number of speculative lines 110s in split cache 100.

In some embodiments, cache manager 135 is configured to adjust the number of speculative lines 110s based on a value of a miss counter, a performance data, or a branch prediction from BPU 107. In some embodiments, cache manager 135 is configured to pre-select the number of speculative lines 110s based on a pre-analysis of a processor workload. In some embodiments, cache manager 135 is configured, in the pre-analysis of a processor workload (or at any stage of a scheduled execution), to increase a number of architectural lines 110a allocated to split cache 100 when a speculative line 110s is free or invalid, the number of architectural lines 110a are occupied, and a data access is issued from an architectural instruction. Accordingly, when an architectural line is desired to be placed in the cache and the architectural cache lines 110a are full, instead of evicting an architectural cache line 110a, cache management unit 135 may change the state of a speculative line 110s to architectural to hold the new line (and increase k by 1), depending on analysis of the heuristic. This frees a speculative line that is currently unused or, if the heuristic suggests it is the best, evict a speculative line, turn it into arch, and use it for the incoming arch cache line data. In some embodiments, when an architectural line is desired to be inserted into cache 100, but the number of architectural lines 110a is full, then cache management unit 135 may evict an architectural line using a 'least recently used' (LRU) policy.

In some embodiments, logic unit 50 includes a schedule buffer 105 to store an out of order instruction being executed by logic unit 50, and to reorder a cache line 110 accessed by the out of order instruction to an ordered architectural line 110a in split cache 100. In some embodiments, cache lines 110 may include a status bit indicating whether the line is architectural (110a) or speculative (110s). Accordingly, in some embodiments cache manager 135 is further configured to convert a speculative line 110s into an architectural line 110a by adjusting a status bit when the speculative line 110s is accessed by an architectural instruction.

In some embodiments, cache manager 135 is further configured to prevent an architectural line 110a in split cache 100 from being evicted by a speculative line. In some embodiments, cache manager 135 is further configured to track and clear speculative lines associated to an invalid branch of speculative instructions. In some embodiments, cache manager 135 is further configured to prevent a cache probe instruction (e.g., from probe 120) to access a speculative line 110s in split cache 100. In some embodiments, cache manager 135 is further configured to prevent an external source to access data in a speculative line 110s, wherein the external source includes at least one of a read line presence, a cache flush request, and a read from a second processor.

Memory 150 may include a volatile memory, e.g., dynamic, random-access memory (DRAM), and the like (e.g., disposed in a dual in-line memory module—DIMM). Further, in some embodiments, memory 150 may include nonvolatile memory as well (e.g., a magnetic disk, a hard drive, and the like). A memory interface 151 may be part of logic unit 50 and configured to establish communication with, fetch data from, and write data into, memory 150. When there is a cache "miss" (e.g., an instruction in schedule buffer 105 calls for data that is missing in split cache 100), cache manager 135 instructs memory interface 151 to fetch the missing data from memory 150.

Instructions in schedule buffer 105 may include memory access instructions, i.e., an instruction that reads or writes data to memory 150, or to split cache 100 (e.g., "load/store" instructions). In some embodiments, schedule buffer 105 may also include arithmetic instructions anteceding or succeeding load/store instructions.

In some embodiments, cache manager 135, together with BPU 107, handle exceptions and micro architectural states to detect execution of speculative instructions. BPU 107 then removes speculative instructions from schedule buffer 105 before they impact the architectural state when they turn out to not be in the path of the retired instruction stream (incorrect branch prediction, exception, L2 cache miss, and the like). Instructions that began execution but are not supposed to affect the architectural state often still have measurable results because they may modify split cache 100. When an event in the microarchitecture results in transient instructions being evicted from schedule buffer 105 and schedule buffer 105 is re-ordered in a correct sequence, split cache 100 evicts (marks as invalid) speculatively fetched cache lines. Thus, in some embodiments, logic unit 50 avoids filling speculative cache lines 110s with undesirable data. Accordingly, whether an instruction requesting the data is speculative or architectural, the requested data is fetched by cache manager 135 from either split cache 100, whichever "hits" the access request. Accordingly, cache manager 135 may be configured to split cache 100 and copy, from memory 150, missing data that is not already present, or to evict data to free space in split cache 100. Accordingly, architectural instructions may access data from speculative cache lines 110s, which then may be copied into architectural lines 110a.

Cache manager 135 removes cache lines 110 from split cache 100 when status bit 115 is in a speculative state for an invalid instruction. Cache manager 135 prevents cache probe instructions (e.g., from probe 120) to interact with data in a cache line associated with a status bit in a speculative state. In some embodiments, cache manager 135 is further configured to prevent an external source to access data in a cache line 110 associated with a status bit 115 in a speculative state. The external source may include at least one of a 'read line' presence, a 'cache flush' request, and a 'read' from a second logic unit.

FIGS. 2A-D illustrate computer devices 20A, 20B, 20C, and 20D (hereinafter, collectively referred to as "computer devices 20") respectively, configured to be inert to speculative cache attacks, according to some embodiments. Computer devices 20 include logic units 250A, 250B, 250C, and 250D (hereinafter, collectively referred to as "logic units 250"), respectively. As illustrated above (cf. computer device 10 and logic unit 50), computer devices 20 include a memory 150, a schedule buffer 105, a split cache 200, a cache manager 135, a BPU 107, a fetch engine 101, a probe 120, and a memory interface 151.

Schedule buffer 105 holds instructions 205-X, 205-2, 205-Y, 205-Z, and 205-5 (hereinafter, collectively referred to as "instructions 205"). Instructions 205 are decoded and issued by the front end of computer devices 20. In some instances, and depending on BPU 107, some of instructions 205 may be identified as architectural, e.g., current program counter (PC, or 'instruction pointer') instructions, and some of instructions 205 may be identified as speculatively issued instructions. When a speculative instruction 205 is determined to be invalid (e.g., part of an abandoned execution branch), its effect on cache 200 and logic units 250 is squashed, and the speculative instruction is removed from schedule buffer 105. Squashed instructions should not modify architectural state nor leave data in the cache. At a later time, probe 120 determines when a memory address is 'cached' (e.g., when a cache line including data revealing an address location in memory 150 is accessed). Split cache 200 includes cache line 210-X (fetched by instruction 205-X), cache line 210-Y (fetched by instruction 205-Y) and cache line 210-Z (fetched by instruction 205-Z). When instruction 205-X is an instruction that will be retired at a later point (e.g., executed by logic units 250) then data 210-X is a valid data entry and it is desirably maintained in architectural portion 210a of split cache 200. When instructions 205-Y and 205-Z are speculative instructions, then cache lines 210-Y and 210-Z may expose a vulnerable address location in memory 150 if accessed by a malicious agent controlling cache manager 135 (e.g., a third party application running on logic units 250). Accordingly, cache lines 210-Y and 210-Z may be copied into a speculative portion 210s of split cache 200.

Figure 2A:
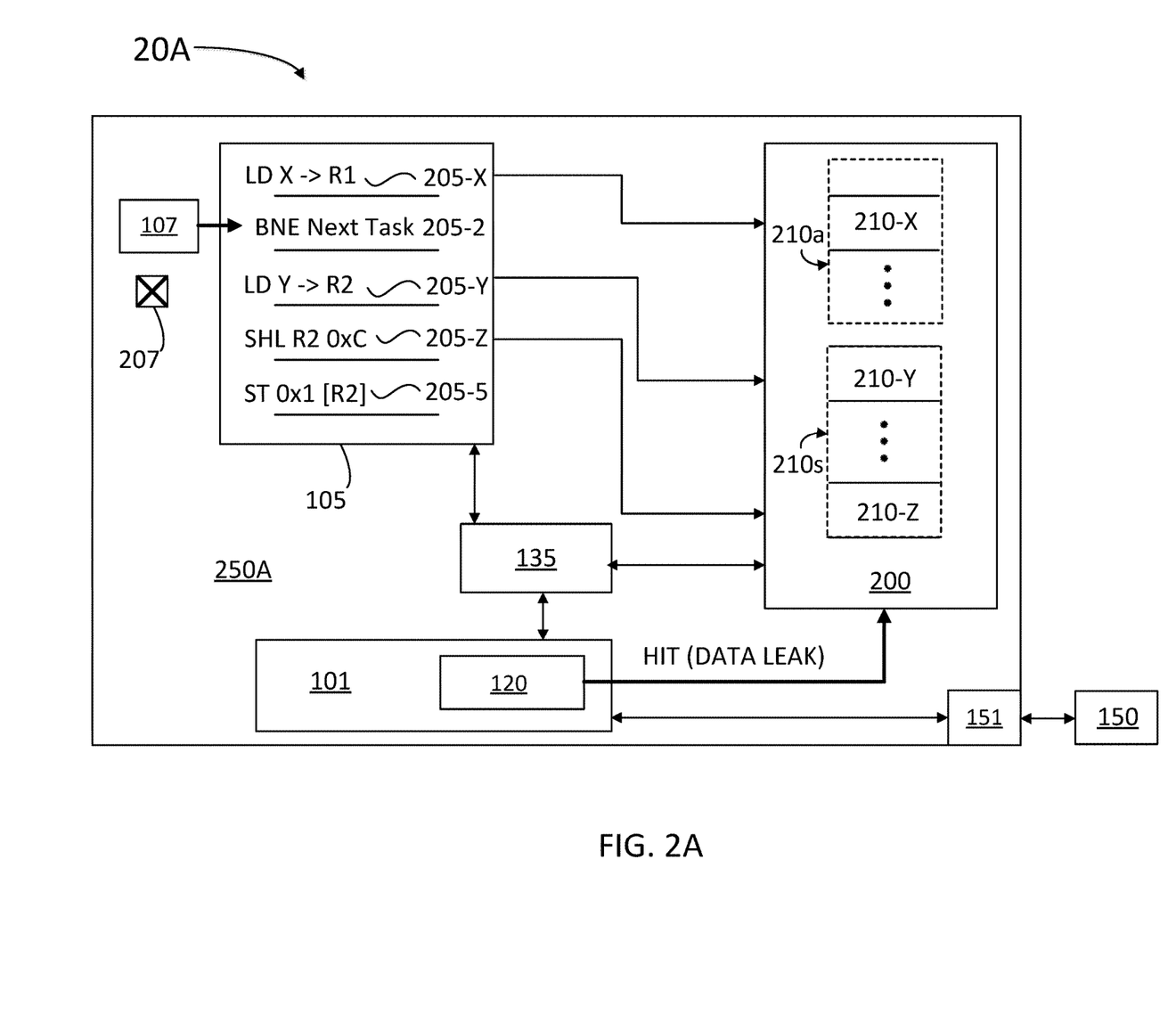
FIGS. 2A-D illustrate a logic unit configured to be inert to speculative cache attacks, according to some embodiments.

FIG. 2A shows computer device 20A under a possible meltdown attack. The speculative execution logic fetches and issues a number of instructions 205-1, 205-2, 205-3, 205-4, and 205-5 after the memory access to cache line 210-1 (X), which is slow if not cached. The next instruction (e.g., instruction 205-2) is a branch that depends on the slow memory access to X, so it will access BPU 107. Spectre attacks train BPU 107 to force certain speculative branch paths, allowing selected instructions to run speculatively. In some scenarios, BPU 107 may predict that instructions 205-2 through 205-5 will be "Not Taken" (bit 207 in low state) so that follow-through instructions 205-3, 205-4, and 205-5 are speculatively executed. In a common Meltdown attack, the instruction stream tries to access a location in memory 150 for data in cache line 210-2 (Y). This location may include a secret value not accessible in memory 150. Accordingly, the speculative attack (e.g., Meltdown) attempts to access this memory location by computing the secret value (shift left L2=multiply by 4096) to generate an address Z and then finding the location of Z when probe 120 detects the incorrect path (e.g., speculative instructions 205-3, 205-4, and 205-5) and evicts instructions 205-3, 205-4, and 205-5. Having the value of location Z, the speculative attack then determines the secret value stored at Y.

Figure 2B:
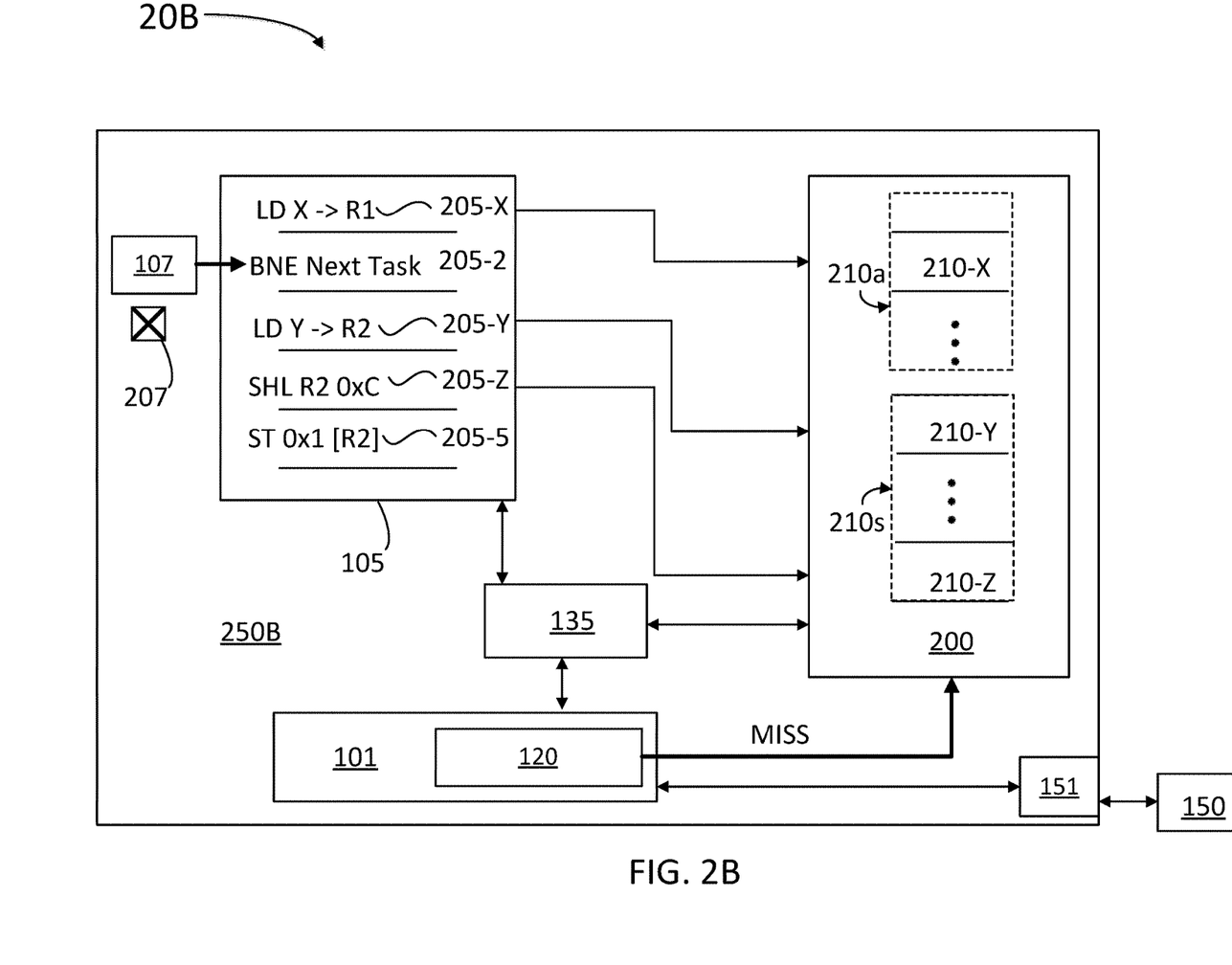

FIG. 2B shows the process of using the architectural portion 210a and the speculative portion 210s of split cache 200 to securely manage data lines fetched by speculative and architectural cache lines 210. Accordingly, cache lines 210-X and 210-Y, associated with speculative instructions 205-1, 205-2, and 205-3, are identified as speculative and copied in the speculative portion 210s of split cache 200. Any attempt from probe 120 to access memory locations associated with cache lines 210-X and 210-Y while instructions 205-X and 205-Y are still in a speculative state result in no data being returned from cache 200 (or from memory 150, bypassing cache 200). In some embodiments, probe instructions return information on the state of a cache line 210.

Figure 2C:
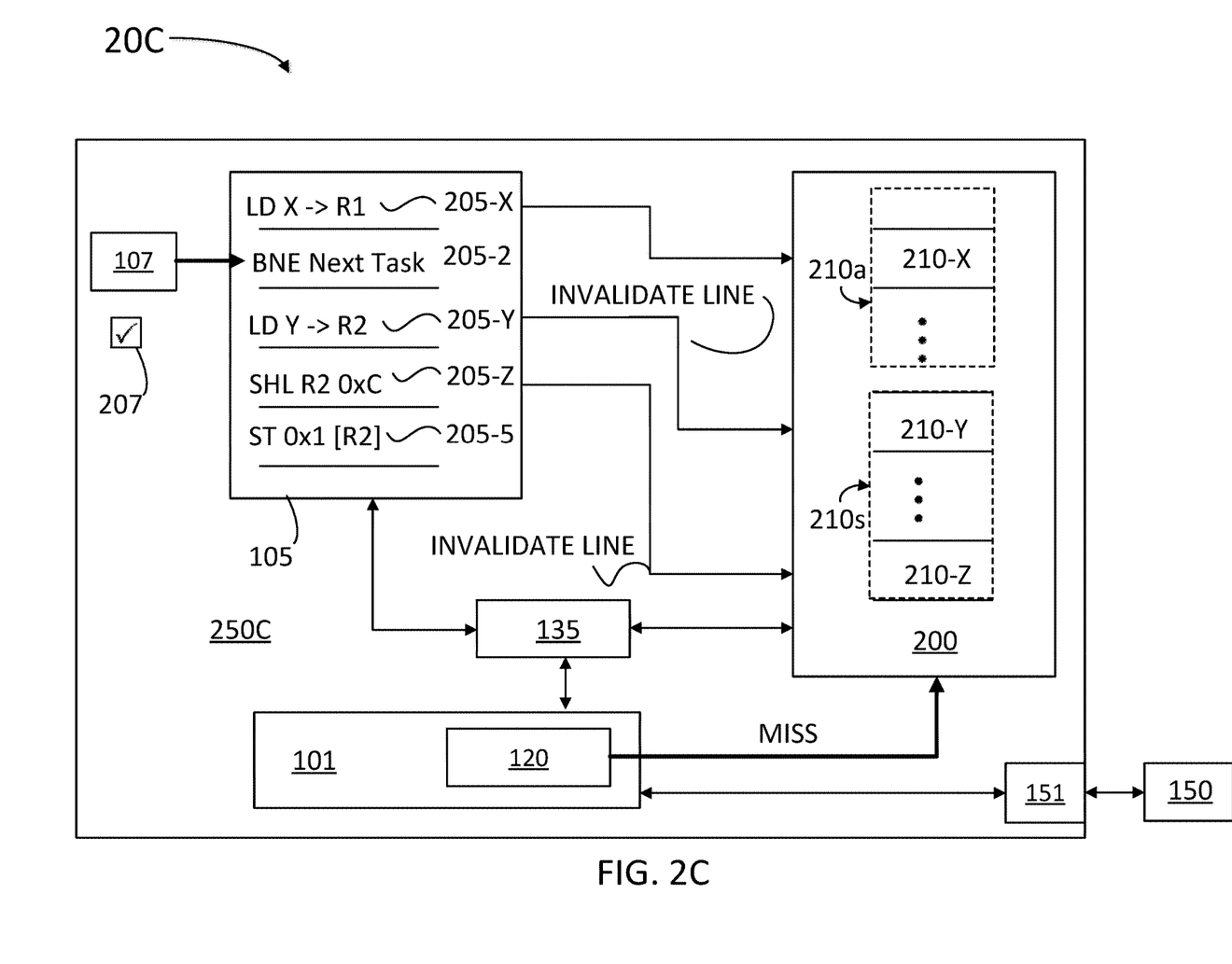

FIG. 2C continues from FIG. 2B. After a first access to cache line 210-X has returned, the branch can resolve and it is "Taken," (bit 207) meaning the later instructions 205-Y, 205-Z, and 205-5 which were executed speculatively are not valid and should be evicted. Cache manager 135 invalidates cache lines 210-X, 210-Y, and 210-Z before probe 120 finds the locations for cache lines 210-Y and 210-Z in memory 150.

Figure 2D:
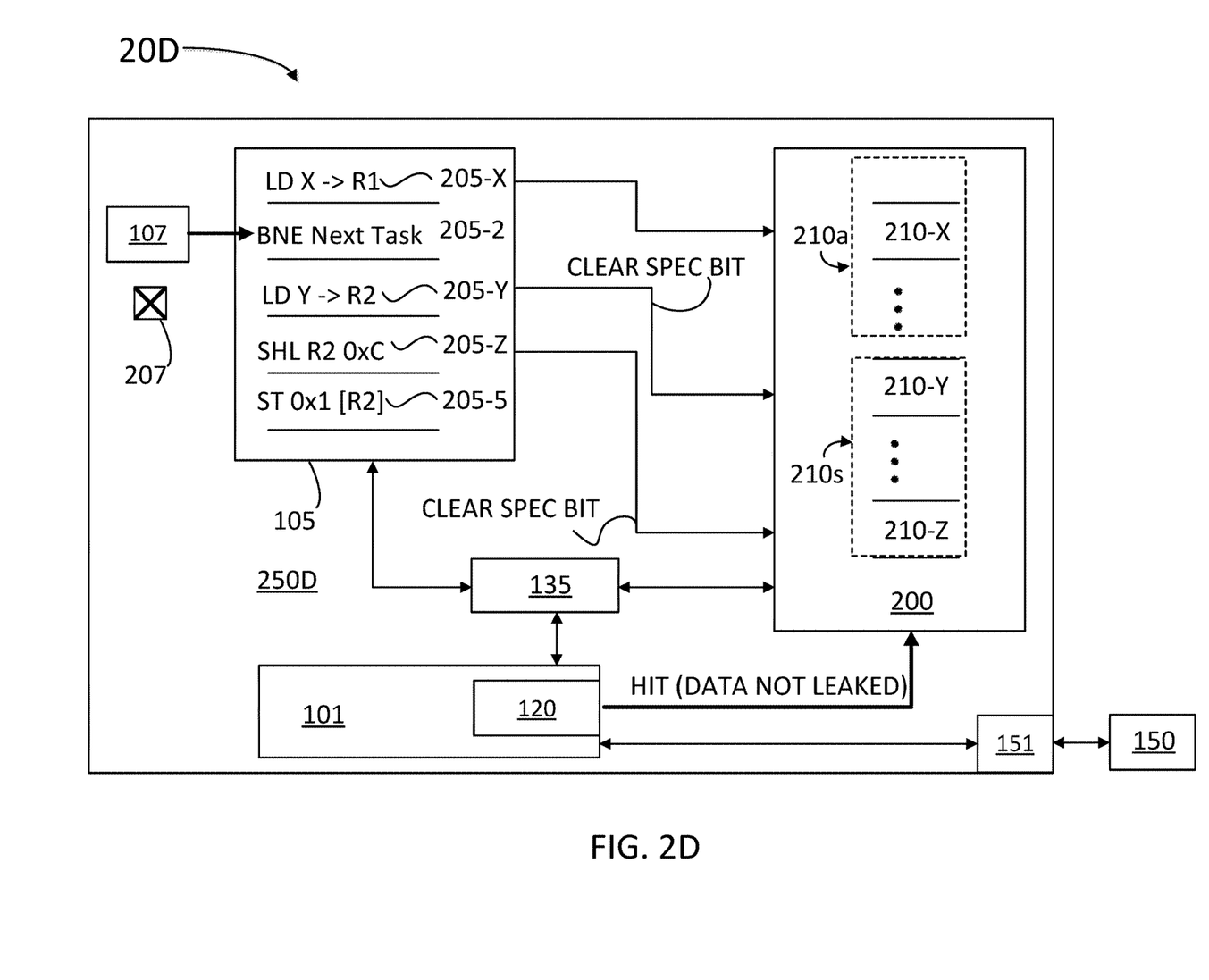

FIG. 2D shows operation of logic unit 250D when speculative instructions 205-X, 205-Y, and 205-Z are in a 'true' instruction stream (including access to locations Y and Z being permitted) and the branch is resolved as Not Taken (bit 207 to high). As schedule buffer 105 retires each instruction in order, it moves cache lines 210 from speculative portion 210s to architectural portion 210a of split cache 200.

Figure 3:
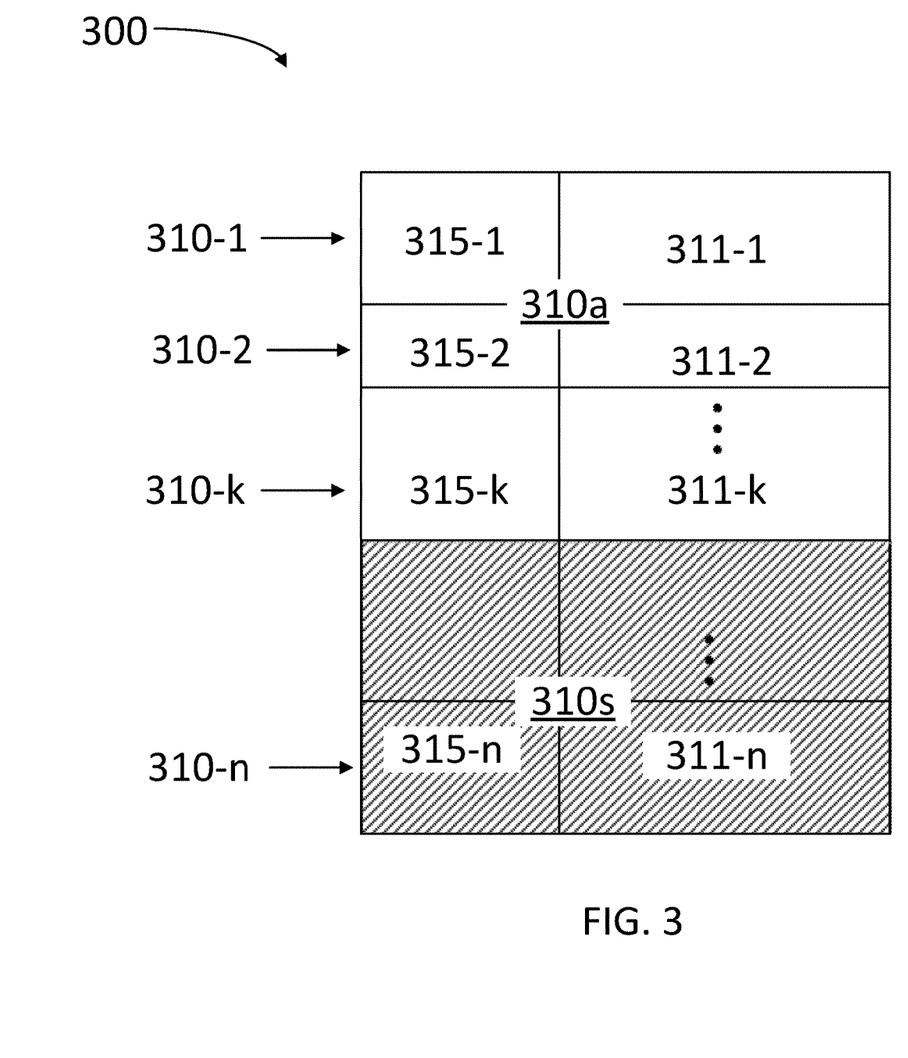
FIG. 3 illustrates an architecture of a cache in a logic unit configured to be inert to speculative cache attacks, according to some embodiments.

FIG. 3 illustrates an architecture of a split cache 300 in a logic unit configured to be inert to speculative cache attacks (e.g., logic units 50 and 250), according to some embodiments. Split cache 300 includes cache lines 310-1, 310-2, through 310-$k$ and 310-$n$ ($k<n$, hereinafter, collectively referred to as "cache lines 310"). Each of cache lines 310 includes a status bit 315-1, 315-2, through 315-$k$ and 315-$n$ (hereinafter, collectively referred to as "status bits 315") and a data line 311-1, 311-2, through 311-$k$ and 311-$n$ (hereinafter, collectively referred to as "data lines 311"). Status bits 315 may be a one-register set to a high state ('1,' or 'speculative state') when the corresponding data line 311 was fetched by a speculative instruction, and to a low state ('0,' or 'true state') when the corresponding data line 311 was fetched by an architectural instruction. Accordingly, status bits 315-1 through 315-$k$ may be set to a low state for architectural data lines 310a. Likewise, status bits 315-(k+1) through 315-$n$ may be set to a high state for speculative data lines 310s.

When status bit 315-$j$ indicates a speculative state ($k \leq j \leq n$), modifications to data line 311-$j$ are prevented from altering the architectural state of split cache 300. One example of speculative instructions may include micro-operations (μOPs, cf. Meltdown attacks) generated by the computer device. One or more status bits 315 keep track of the speculative execution state of each μOP. More generally, the execution logic is already tracking the speculative state of each instruction or μOP portion of an instruction. In some embodiments, pieces of an instruction (μOps) act like the whole in tracking speculative data accesses in cache 300 Accordingly, many cache lines 310 may have a status bit 315 in a speculative state (e.g., when the logic unit speculatively executes a long series of instructions). The performance penalty from marking status bits 315 in split cache 300 by the management unit is relatively low, compared to the common tasks of setting a parallel path to the logic unit and split cache 300. In some embodiments, status bits 315 may include a few mega-bits ($10^6$ bits, or 'Mb') and ROB entry (if needed), with the associated logic to access and handle the bits. The associated logic may include one, two, or more columns of complementary metal-oxide semiconductor (CMOS) gates, such as NAND and OR gates, using negative channel and positive channel field effect transistors (NFETs/PFETs). Accordingly, setting, evaluation, and tracking of status bits 315 has only a limited effect on critical path timing for the computations of the logic unit.

When an architectural instruction accesses a cache line 310-$j$ that has status bit 315-$j$ set to speculative state (e.g., 315-$j$='1'), the management unit may reset status bit 315-$j$ back to a true state (e.g., 315-$j$='0'). In some embodiments, cache lines 310 may be copied within either of architectural data lines 310a and speculative data lines 310s. In some embodiments, data lines are logically moved between one type (e.g., architectural) and the other type (e.g., speculative) by setting status bit 315 (e.g., no data actually moves). Some embodiments include a heuristic balance between the number of architectural lines 310a and the number of speculative lines 310s. The heuristic balance may include re-setting one or more status bits 315 from a speculative state to an architectural state set in split cache 300 to prevent the overgrowth of the portion allocated to speculative lines 310s in split cache 300 when multiple speculative instructions are fetched/decoded/issued.

In some embodiments, a logic unit as disclosed herein may be implemented in the context of a 'modified,' 'owned,' 'exclusive,' 'shared,' and 'invalid' (MOESI) cache coherency protocol. In such configurations, for each cache state, we consider the interaction when status bit 315 is in the speculative state ('SB'), which creates a matrix of status bit values in addition to the MOESI cache states. In such matrices, certain entries may be predefined, as follows:

Modified and speculative (M+SB): This may be an empty state because, until the retire logic sees a memory 'write' in schedule buffer 105, the management unit will not modify the cache line. No other thread/core (e.g., a different instruction branch from the same or a different logic unit) can write cache line 310 without clearing SB to '0' (true state).

Owned, speculative, and dirty (O+SB+Dirty): This may be an empty state because the logic unit may not write cache line 310-$j$ (e.g., make it 'dirty') until status bit 315-$j$ is in a true state. When cache line 310-$j$ was already in an O+dirty state, most likely status bit 315-$j$ would be in a true state.

Owned, speculative, and clean (O+SB+Clean): In this case, the management unit may invalidate cache line 310-$j$ (Exclusive).

Exclusive and speculative (E+SB): The management unit may invalidate cache line 310-$j$ (Shared).

Shared and speculative (S+SB): The management unit may invalidate cache line 310-$j$.

Invalid and speculative (I+SB): May be an empty state, because when cache line 310-$j$ is invalid, the status bit 315-$j$ may be cleared automatically (e.g., SB may not be set for invalid lines.

Figure 4:
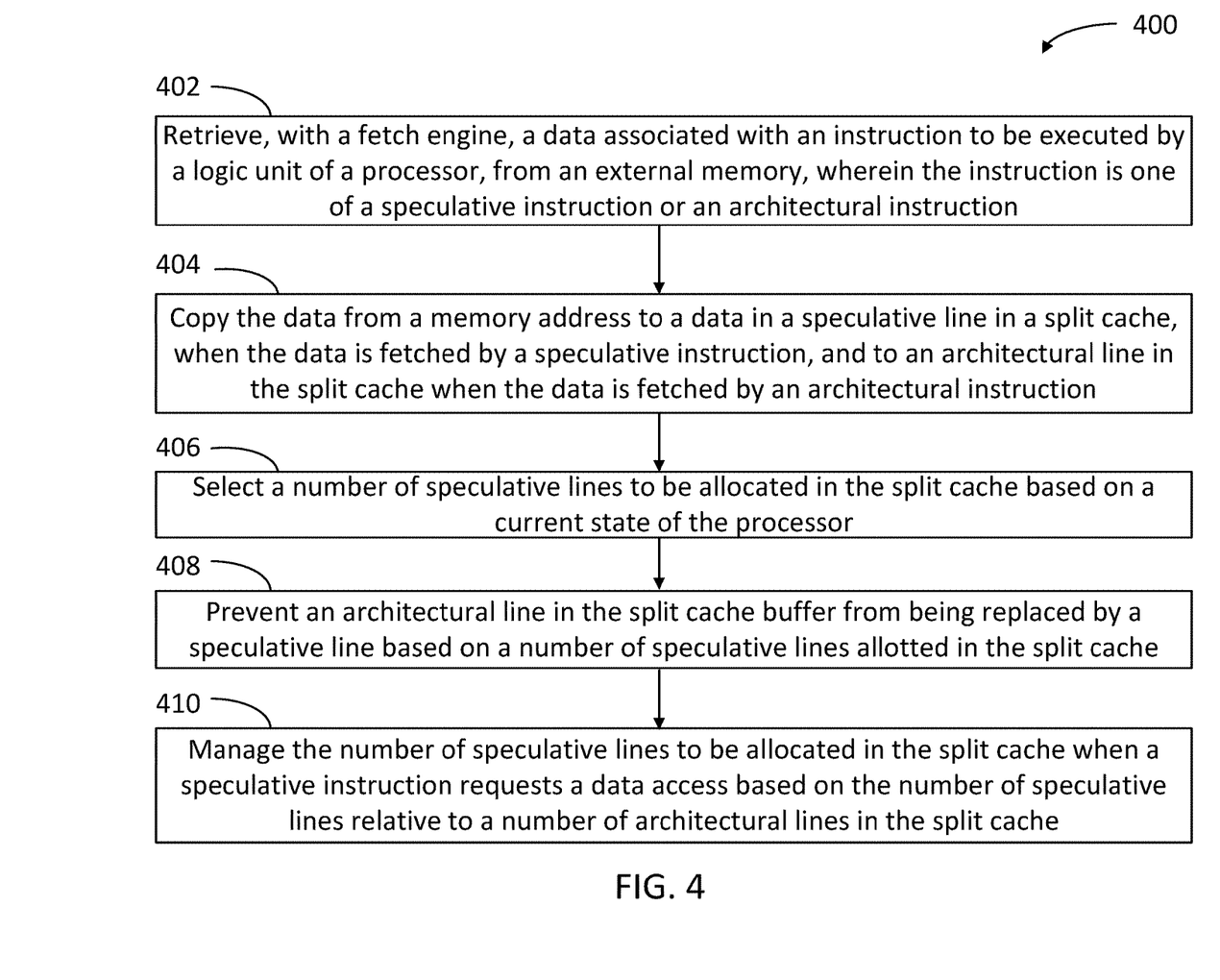
FIG. 4 is a flow chart illustrating steps in a method to handle instructions with a logic unit configured to resist speculative cache attacks, according to some embodiments.

FIG. 4 illustrates a flow chart including steps in a method 400 for reducing a cache miss vulnerability in a central processing unit, according to some embodiments. At least one or more of the steps in method 400 may be performed by a central processing unit, including a processor, a logic unit, an instruction queue, a split cache, a cache management unit, and an instruction fetch engine, as disclosed herein (e.g., logic unit 50, schedule buffer 105, split cache 100, cache manager 135, and fetch engine 101). Methods consistent with the present disclosure may include at least one or more of the steps in method 400, performed in any order. For example, in some embodiments, a method may include one or more of the steps in method 400 performed overlapping in time, simultaneously, or quasi simultaneously.

Step 402 includes retrieving, with the fetch engine, a data associated with an instruction to be executed by a logic unit of a processor, from an external memory. In some embodiments, the instruction may be one of a speculative instruction or an architectural instruction.

Step 404 includes copying the data from a memory address to a data in a speculative line in the split cache, when the data is fetched by a speculative instruction, and to an architectural line in the split cache when the data is fetched by an architectural instruction.

Step 406 includes selecting a number of speculative lines to be allocated in the split cache based on a current state of the processor.

Step 408 includes preventing an architectural line in the split cache from being replaced by a speculative line based on a number of speculative lines allotted in the split cache, in some embodiments. Accordingly, step 408 may include heuristically balancing the number of architectural lines and the number of speculative lines in the split cache. Because an architectural line may not be evicted by a speculative line, step 408 may include maintaining at least one speculative line in the split cache. In some embodiments, step 408 includes preventing cache lines from becoming all speculative or all architectural.

Step 410 includes managing the number of speculative lines to be allocated in the split cache when a speculative instruction requests a data access based on the number of speculative lines relative to a number of architectural lines in the split cache.

Figure 5:
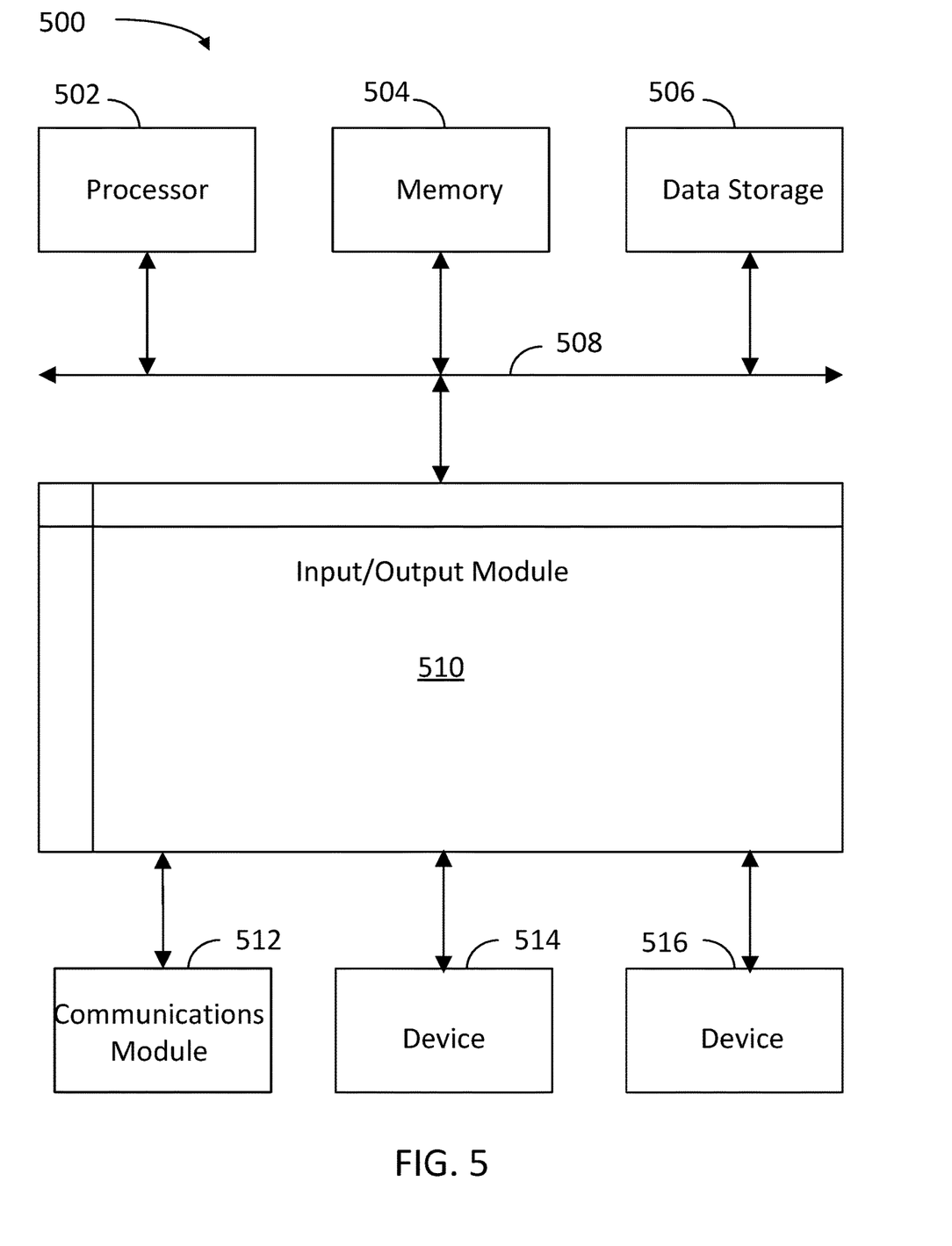
FIG. 5 is a block diagram illustrating an example computer system, including a logic unit configured to reduce cache miss vulnerability, according to some embodiments.

FIG. 5 is a block diagram illustrating an example computer system 500, including a logic unit configured to reduce cache miss vulnerability, according to some embodiments. In certain aspects, computer system 500 can be implemented using hardware or a combination of software and hardware, either in a dedicated server, integrated into another entity, or distributed across multiple entities. Moreover, in some embodiments, computer system 500 may be configured to perform at least some of the steps in method 400.

Computer system 500 includes a communication path 508 or other communication mechanisms for communicating information, and a processor 502 coupled with communication path 508 for processing information. By way of example, computer system 500 can be implemented with one or more processors 502. Processor 502 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 502 may include modules and circuits configured as a 'placing' tool or engine, or a 'routing' tool or engine, to place devices and route channels in a circuit layout, respectively and as disclosed herein.

Computer system 500 includes, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to communication path 508 for storing information and instructions to be executed by processor 502. Processor 502 and memory 504 can be supplemented by, or incorporated in, special purpose logic circuitry.

The instructions may be stored in memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to communication path 508 for storing information and instructions.

Computer system 500 is coupled via input/output module 510 to various devices. The input/output module 510 is any input/output module. Example input/output modules 510 include data ports such as USB ports. The input/output module 510 is configured to connect to a communications module 512. Example communications modules 512 include networking interface cards, such as Ethernet cards and modems. In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as an LED (light emitting diode), CRT (cathode ray tube), or LCD (liquid crystal display) screen, for displaying information to the user.

Methods as disclosed herein may be performed by computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein (e.g., as in method 400). One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 includes servers and personal computer devices. A personal computing device and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise communication path 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns or holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to, a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A processor, comprising:
   a logic unit configured to execute multiple instructions, each of the multiple instructions being one of a speculative instruction or an architectural instruction;
   a split cache comprising multiple lines, each line including a data accessed by an instruction and copied into the split cache from a memory address, wherein a line is identified as a speculative line for the speculative instruction, and as an architectural line for the architectural instruction; and
   a cache manager configured to:
      select a number of speculative lines to be allocated in the split cache, based on a current state of the processor,
      prevent an architectural line from being replaced by a speculative line based on a number of speculative lines allotted in the split cache,
      manage the number of speculative lines to be allocated in the split cache when the speculative instruction requests a data access based on the number of speculative lines relative to a number of architectural lines, increase the number of speculative lines when an architectural line in the split cache is free or invalid, wait for architectural lines to be empty for allocation to a speculative line when the number of speculative lines are fully occupied, and increase a number of architectural lines allocated to the split cache when a speculative line is free or invalid, the number of architectural lines are occupied, and a data access is issued from an architectural instruction.

2. The processor of claim 1, wherein the cache manager is configured to modify the number of speculative lines in the split cache based on one of a least recently used state, a modified state, an exclusive state, a shared state, or an invalid state, of one or more architectural lines in the split cache.

3. The processor of claim 1, wherein the cache manager is configured to wait for a pre-selected number of accesses to the number of speculative lines before adjusting the number of speculative lines.

4. The processor of claim 1, wherein the cache manager is configured to adjust the number of speculative lines based on a value of a miss counter, a performance data, or a branch prediction.

5. The processor of claim 1, wherein the cache manager is configured to pre-select the number of speculative lines based on a pre-analysis of a processor workload.

6. The processor of claim 1, wherein the cache manager is configured to maintain the number of speculative lines within one or two of the number of architectural lines.

7. The processor of claim 1, wherein the cache manager further comprises a tunable parameter to select the number of speculative lines to be allocated in the split cache.

8. The processor of claim 1, wherein the cache manager is further configured to convert a speculative line into an architectural line by adjusting a status bit when the speculative line is accessed by an architectural instruction.

9. The processor of claim 1, wherein the cache manager is further configured to prevent an architectural line in the split cache from being evicted by a speculative line.

10. The processor of claim 1, wherein the cache manager is further configured to track and clear speculative lines when speculative execution is discarded.

11. The processor of claim 1, wherein the cache manager is further configured to prevent a cache probe instruction to access a speculative line in the split cache.

12. The processor of claim 1, wherein the cache manager is further configured to prevent an external source to access data in a speculative line, wherein the external source comprises at least one of a read line presence, a cache flush request, and a read from a second processor.

13. A cache, comprising:

a management unit;

a first plurality of architectural lines storing data fetched by an architectural instruction to be executed by a processor coupled with the cache, the architectural instruction, when executed, configured to modify an architecture of the cache; and a second plurality of speculative lines storing data fetched by a speculative instruction, wherein the speculative instruction is invalidated by the management unit, wherein a number of the first plurality of architectural lines and the second plurality of speculative lines is dynamically determined based on a state of the processor, wherein the management unit is configured to:

increase the second plurality of speculative lines when an architectural line in the cache is free or invalid, wait for architectural lines to be empty for allocation to a speculative line when the second plurality of speculative lines are fully occupied, and increase a number of architectural lines allocated to the split cache when a speculative line is free or invalid, the number of architectural lines are occupied, and a data access is issued from an architectural instruction.

14. The cache of claim 13, wherein the management unit is further configured to convert a speculative line into an architectural line when the speculative line is accessed by an architectural instruction.

15. The cache of claim 13, wherein the management unit is further configured to adjust the number of speculative lines based on a value of a miss counter, a performance data, or a branch prediction.

16. The cache of claim 13, wherein the management unit is further configured to modify the number of speculative lines in the split cache based on one of a least recently used state, a modified state, an exclusive state, a shared state, or an invalid state, of one or more architectural lines in the split cache.

17. A method, comprising:

retrieving, with a fetch engine, a data associated with an instruction to be executed by a logic unit of a processor, from an external memory, wherein the instruction is one of a speculative instruction or an architectural instruction;

copying the data from a memory address to a data in a speculative line in a split cache, when the data is fetched by a speculative instruction, and to an architectural line in the split cache when the data is fetched by an architectural instruction;

selecting a number of speculative lines to be allocated in the split cache based on a current state of the processor;

preventing an architectural line in the split cache from being replaced by a speculative line;

managing the number of speculative lines to be allocated in the split cache when a speculative instruction requests a data access based on the number of speculative lines relative to a number of architectural lines in the split cache;

increasing the number of speculative lines when an architectural line in the split cache is free or invalid;

waiting for architectural lines to be empty for allocation to a speculative line when the number of speculative lines are fully occupied; and increasing a number of architectural lines allocated to the split cache when a speculative line is free or invalid, the number of architectural lines are occupied, and a data access is issued from an architectural instruction.

18. The method of claim 17, further comprising modifying the number of speculative lines based on one of a least recently used state, a modified state, an exclusive state, a shared state, or an invalid state, of one or more architectural lines in the split cache.

19. The method of claim 17, further comprising selecting a number of accesses to the number of speculative lines before adjusting the number of speculative lines.

20. The method of claim 17, further comprising adjusting the number of speculative lines based on a value of a miss counter, a performance data, or a branch prediction.

* * * * *